United States Patent
Wyman et al.

(10) Patent No.: US 10,922,848 B2
(45) Date of Patent: Feb. 16, 2021

(54) PIXEL STORAGE FOR GRAPHICAL FRAME BUFFERS

(71) Applicant: Avago Technologies International Sales Pte. Limited, Singapore (SG)

(72) Inventors: Richard Hayden Wyman, Sunnyvale, CA (US); Brian Francis Schoner, Fremont, CA (US); David Chao Hua Wu, San Diego, CA (US); Timothy James Mamtora, Cambridge (GB)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 16/391,148

(22) Filed: Apr. 22, 2019

(65) Prior Publication Data

US 2019/0333249 A1     Oct. 31, 2019

Related U.S. Application Data

(60) Provisional application No. 62/662,399, filed on Apr. 25, 2018.

(51) Int. Cl.
*G06T 9/00* (2006.01)
*G06T 1/60* (2006.01)

(52) U.S. Cl.
CPC . *G06T 9/00* (2013.01); *G06T 1/60* (2013.01)

(58) Field of Classification Search
CPC ......... G06T 9/00; G06T 1/60; G09G 2340/02; G09G 2360/18; G09G 2350/00; G09G 5/363; G09G 5/395; H04N 19/423; H04N 19/182; H04N 19/176; H04N 19/186

USPC .......................................................... 345/547
See application file for complete search history.

(56) References Cited

U.S. PATENT DOCUMENTS

| | | | | |
|---|---|---|---|---|
| 6,126,545 A * | 10/2000 | Takahashi | ............... | A63F 13/10 463/32 |
| 2002/0194175 A1* | 12/2002 | Gaebel | ..................... | H03M 7/30 |
| 2003/0016226 A1* | 1/2003 | Lu | .............................. | G06T 9/00 345/555 |
| 2004/0008869 A1* | 1/2004 | Tsujimoto | ............... | G01B 11/30 382/108 |
| 2004/0233150 A1* | 11/2004 | Guttag | ..................... | G09G 3/34 345/87 |
| 2005/0117799 A1* | 6/2005 | Fuh | ........................ | G06T 5/009 382/169 |
| 2007/0202842 A1* | 8/2007 | Shao | ...................... | H04N 19/89 455/403 |

(Continued)

*Primary Examiner* — Ke Xiao
*Assistant Examiner* — Kim Thanh T Tran
(74) *Attorney, Agent, or Firm* — Morgan, Lewis & Bockius LLP

(57) ABSTRACT

A device implementing the subject pixel storage for graphical frame buffers may include at least one processor configured to obtain a plurality of data units containing a plurality of pixels stored in memory, each of the plurality of data units including a first pixel of the plurality of pixels packed in succession with at least a portion of a second pixel of the plurality of pixels, in which the plurality of pixels is represented by a number of bits, obtain a group of pixels from the plurality of pixels, and store the group of pixels using a targeted number of bits. A method and computer program product implementing the subject pixel storage for graphical frame buffers is also provided.

20 Claims, 8 Drawing Sheets

(56) References Cited

U.S. PATENT DOCUMENTS

| | | | |
|---|---|---|---|
| 2008/0193028 A1* | 8/2008 | Lan | H04N 19/593 |
| | | | 382/244 |
| 2013/0010865 A1* | 1/2013 | Coban | H04N 19/117 |
| | | | 375/240.12 |
| 2013/0082735 A1* | 4/2013 | Nakamura | H03K 19/215 |
| | | | 326/55 |
| 2018/0324419 A1* | 11/2018 | Lambert | H04N 19/103 |

* cited by examiner

PIXEL STORAGE FOR GRAPHICAL FRAME BUFFERS

CROSS-REFERENCE TO RELATED APPLICATIONS

This application claims the benefit of priority of U.S. Provisional Application No. 62/662,399, entitled "VIDEO CODING," filed on Apr. 25, 2018, of which is hereby incorporated by reference in its entirety.

TECHNICAL FIELD

The present description relates generally to video encoding, compression, and/or storage and video decoding, decompression, and/or storage, but not exclusively, to pixel storage for graphical frame buffers.

BACKGROUND

Standard dynamic range (SDR) media, including images, videos, and renderings, has a limited dynamic range for luminance values or brightness of pixels, constrained by the bit depth or number of bits that may be used to represent the luminance of the pixels according to encoding and decoding standards (e.g. 8 bits per sample). By contrast, high dynamic range (HDR) media standards provide more bits or a greater bit depth (e.g. 10, 12, 16, 24, 32 bits or more per sample), allowing a greater range in the image between white and black or bright and dark regions without introducing unacceptable amounts of contouring due to excessive quantization. As a result, media may have higher contrast, darker dark sections and brighter bright sections.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
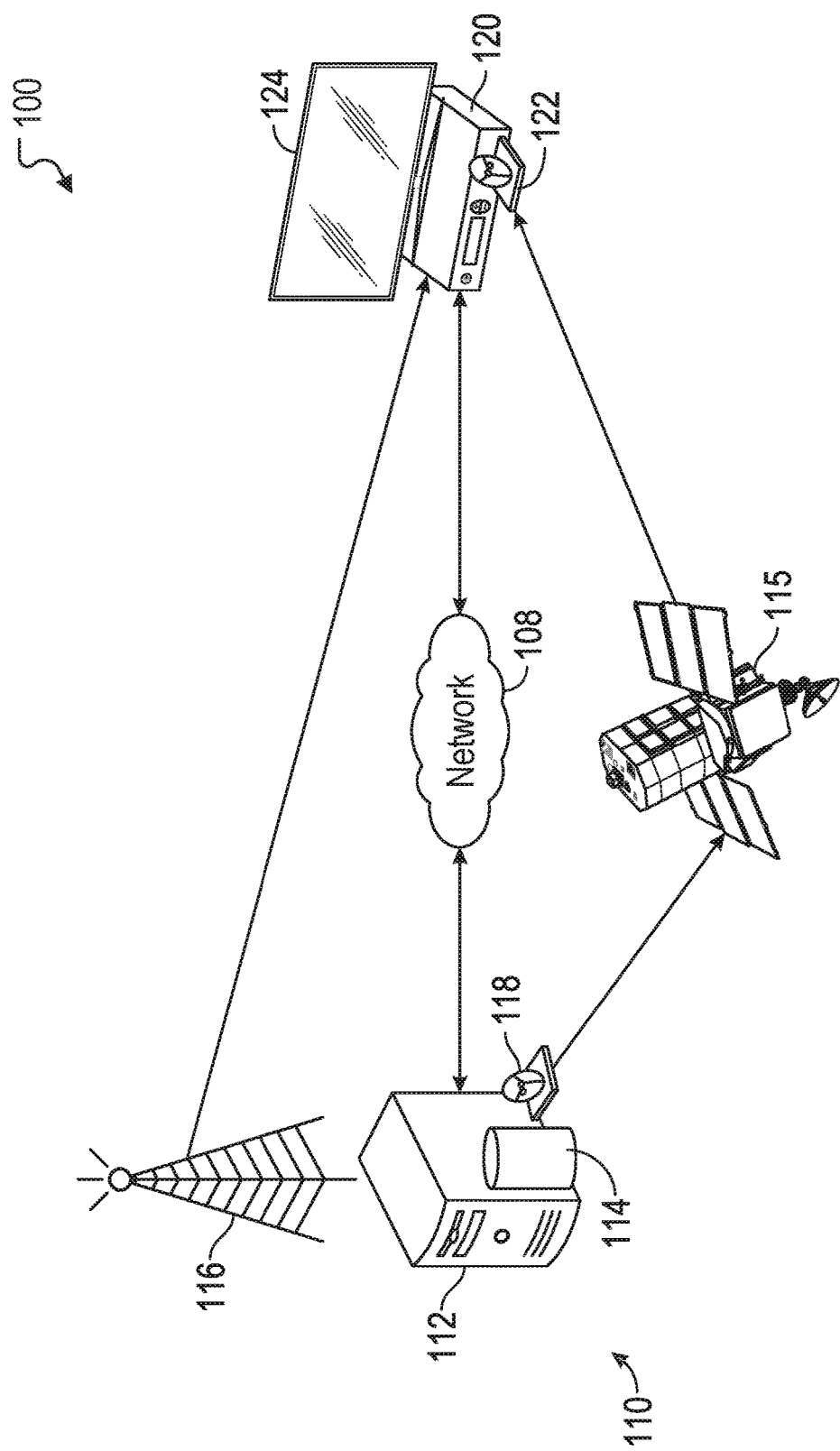
FIG. 1 illustrates an example network environment in which a video coding system may be implemented in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Graphics processing systems typically maintain two types of buffers, namely displayable and non-displayable buffers. Displayable buffers contain pixels that may be sent to a display such as a TV or computer monitor. Non-displayable buffers may contain ancillary data, such as a depth map that the application uses to aid the rendering of the displayable buffers, or they may contain pixel data, such as texture maps, which are used for intermediate processing and are not directly sent to a display.

Legacy systems include SDR systems and typically store pixels for their displayable buffers in memory with 8-bits per component. Three components (red (R), green (G) and blue (B)) are typically stored along with a term called alpha (A), which is used to control the strength of blending between layers of rendered graphics. In some implementations, these components, namely R, G, B and A, may generally be referred together as "RGBA." A typical RGBA pixel may fit into a 32-bit memory location. This is a convenient number of bits that fits (or packs) well with the organization of memory in traditional central processing unit (CPU) and graphics processing unit (GPU) systems. In this respect, any multiple of 32 bits can pack well. In some aspects, pixel data having 64 bits (or some other multiple) may be the most efficient use of memory, such as dynamic random access memory (DRAM). In this example, two pixels (i.e. 2*32 bits=64 bits) would be handled as a single data unit. In some aspects, the term "buffer" generally refers to a DRAM buffer located off-chip.

The traditional memory organization can also be said to be efficient. All 32 bits in the packed RGBA pixel can contain useful and valid information. The traditional memory organization can also be said to offer easy random access. Since one pixel is contained within one 32-bit word, in order to access a particular pixel with a CPU or GPU, the address computation needed to access the 32-bit word is straightforward and efficient.

When a displayable buffer is read out for display, the pixels can be read from the storage buffer (typically DRAM) at a rate that meets the flow of pixels over the interface to the display (such as high-definition multimedia interface (HDMI) or DisplayPort). If the rate of flow of pixels fails to meet the rate needed for display at any time, the picture on the display may be corrupted. In order to prevent such issues, it is necessary to guarantee that the necessary rate can be provided by the system. In order to guarantee that the necessary data flow rate can be provided by the system, it is necessary to know how much data is needed to be read from DRAM at what rate. For the RGBA example given above, the well-defined pixel storage parameters coupled with how many pixels are stored in the buffer, and further coupled with the frame time (e.g., the inverse of the refresh rate of the display) leads to a clearly defined required pixel flow rate from DRAM necessary to avoid display corruption.

HDR systems allow a larger range in brightness (both brighter and darker) than SDR systems. HDR systems also allow a wider range in color gamut. In this respect, HDR systems can display a wider range of brightnesses and colors compared to SDR systems. As such, HDR pixels are not packed efficiently as SDR pixels. When representing pixels in an HDR system, a minimum of 10-bits per component for displayable buffers is required to provide generally acceptable picture quality. If fewer than 10-bits per component are used, the lack of bit-depth resolution of the components can lead to banding and other quantization artifacts on the display. As such, a pixel format that provides a minimum of 10-bits per component would need to be selected. However, there is no current pixel format available that meets the packing, efficiency, random access and real-time access requirements necessary to implement a cost-efficient HDR graphics system.

Figure 2:
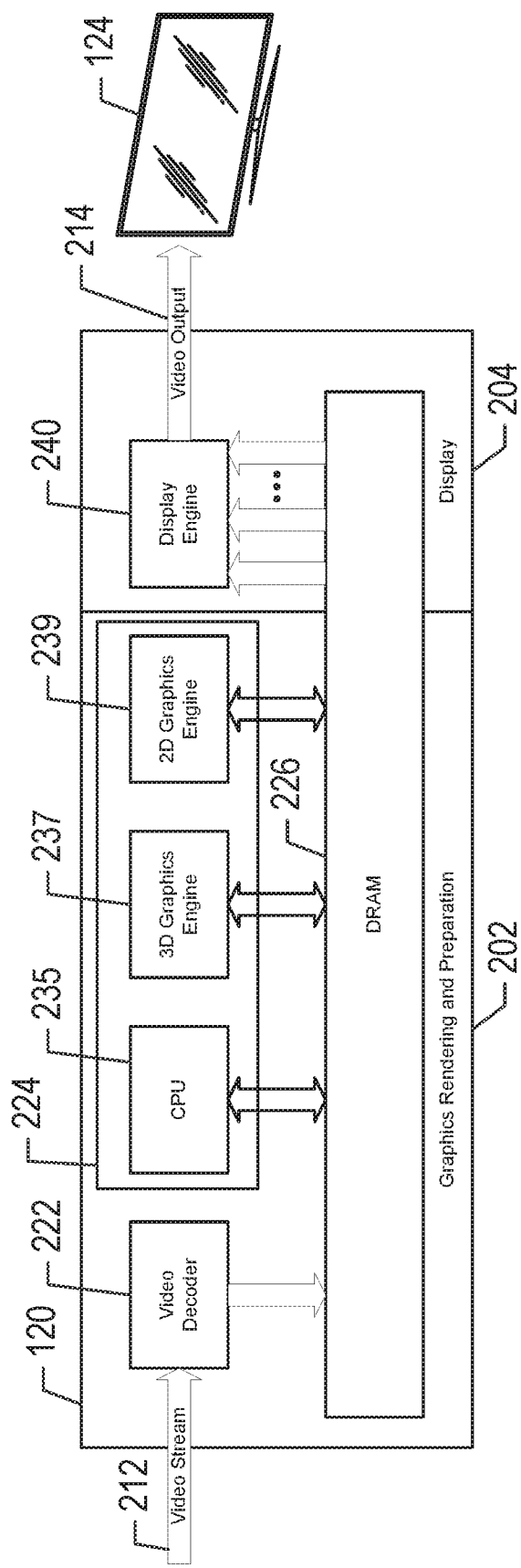
FIG. 2 illustrates an example electronic device implementing a graphics system for pixel storage in graphical frame buffers in accordance with one or more implementations.
Figure 3:
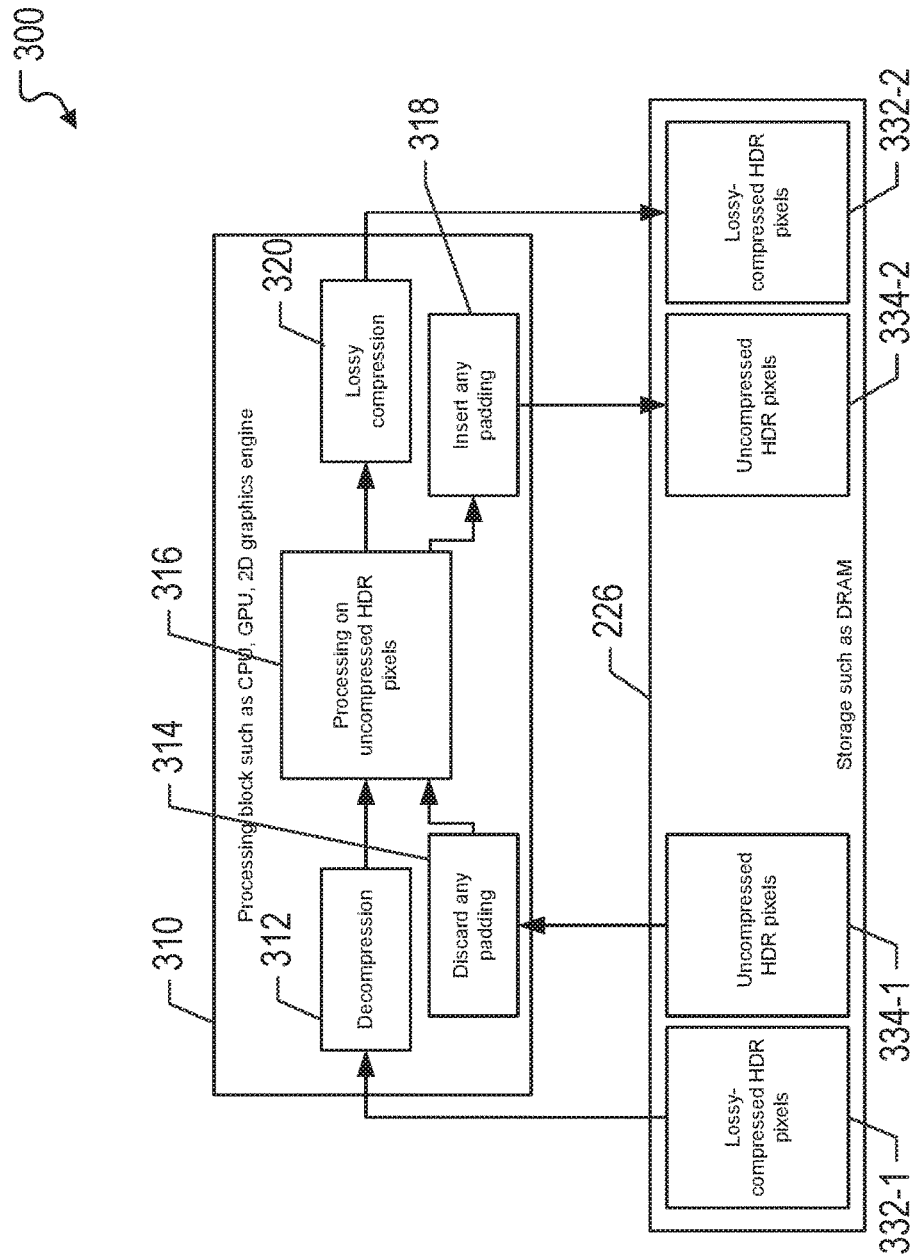
FIG. 3 illustrates a dataflow for an example graphics system for pixel storage in graphical frame buffers in accordance with one or more implementations.
Figure 4:
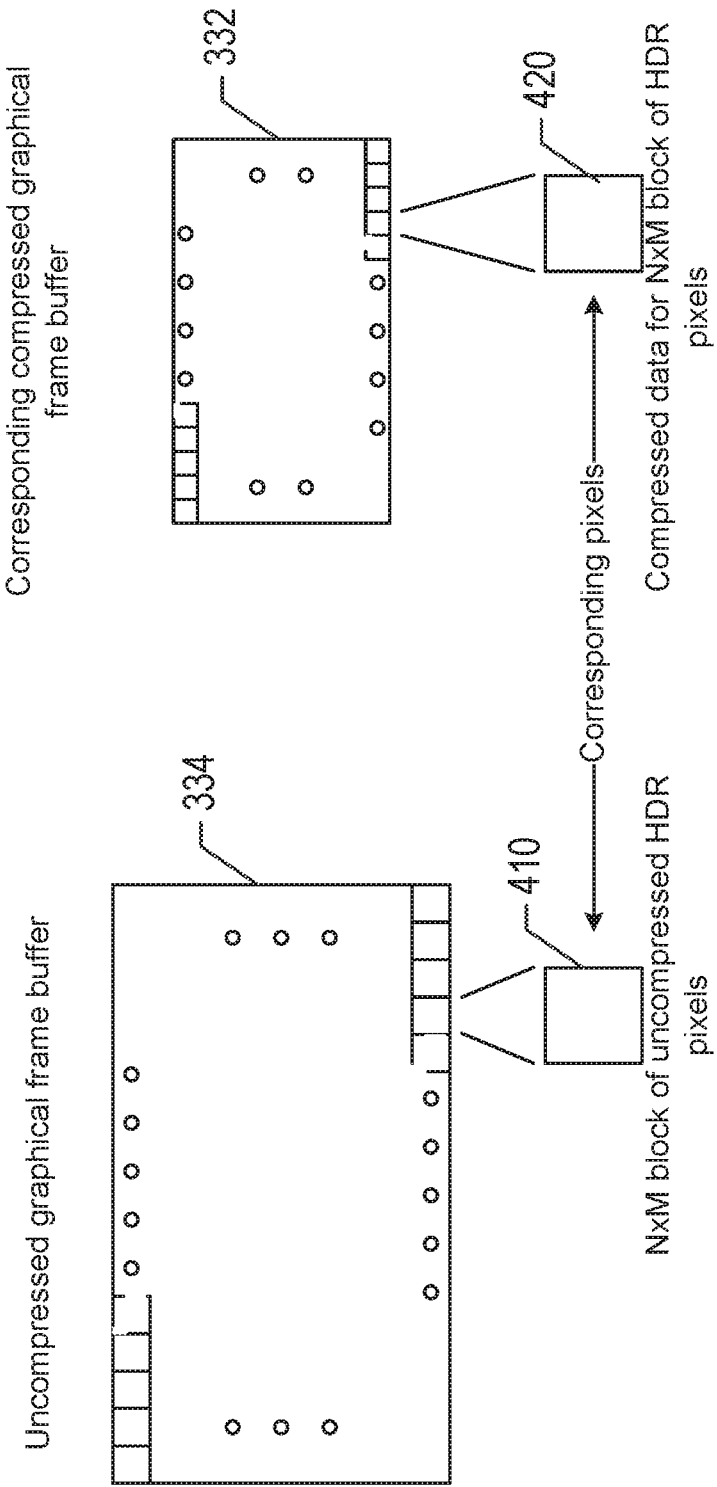
FIG. 4 illustrates an uncompressed graphical frame buffer and a corresponding compressed graphical frame buffer in accordance with one or more implementations.

The subject technology provides for a lossy compression process of storing pixels in HDR graphics systems for use with the displayable graphical frame buffers with the properties described in FIGS. 2-4. Displayable graphical frame buffers of HDR graphics systems can be cost-effectively supported while meeting the necessary graphics system requirements. With the described properties of the pixel format and lossy compression in accordance with one or more implementations, the packing, efficiency, random access and real-time requirements can be met.

FIG. 1 illustrates an example network environment 100 in which a video coding system may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a content delivery network (CDN) 110 that is communicably coupled to an electronic device 120, such as by a network 108. The CDN 110 may include, and/or may be communicably coupled to, a content server 112 for encoding and/or transmitting encoded data streams, such as high-efficiency video coding (HEVC) encoded video streams, AV1 encoded video streams, and/or H266 encoded video streams, over the network 108, an antenna 116 for transmitting encoded data streams over the air, and a satellite transmitting device 118 for transmitting encoded data streams to a satellite 115.

The electronic device 120 may include, and/or may be coupled to, a satellite receiving device 122, such as a satellite dish, that receives encoded data streams from the satellite 115. In one or more implementations, the electronic device 120 may further include an antenna for receiving encoded data streams, such as encoded video streams, over the air from the antenna 116 of the CDN 110. The content server 112 and/or the electronic device 120, may be, and/or may include, one or more components of the electronic system discussed below with respect to FIG. 2.

The network 108 may be a public communication network (such as the Internet, cellular data network, dialup modems over a telephone network) or a private communications network (such as private local area network ("LAN"), leased lines). The network 108 may also include, but is not limited to, any one or more of the following network topologies, including a bus network, a star network, a ring network, a mesh network, a star-bus network, a tree or hierarchical network, and the like. In one or more implementations, the network 108 may include transmission lines, such as coaxial transmission lines, fiber optic transmission lines, or generally any transmission lines, that communicatively couple the content server 112 and the electronic device 120.

The content server 112 may include, or may be coupled to, one or more processing devices, a data store 114, an encoder and/or a compression device. The one or more processing devices execute computer instructions stored in the data store 114, for example, to implement a content delivery network. The data store 114 may store the computer instructions on a non-transitory computer-readable medium. The data store 114 may further store one or more programs, e.g. video and/or audio streams, that are delivered by the CDN 110. The encoder may use a codec to encode video streams, such as an HEVC codec, an AV1 codec, an H266 codec, or any other suitable codec. In one or more implementations, the encoder may implement one or more of the encoding, compression, and/or storage techniques.

In one or more implementations, the content server 112 may be a single computing device such as a computer server. Alternatively, the content server 112 may represent multiple computing devices that are working together to perform the actions of a server computer (such as a cloud of computers and/or a distributed system). The content server 112 may be coupled with various databases, storage services, or other computing devices that may be collocated with the content server 112 or may be disparately located from the content server 112.

The electronic device 120 may include, or may be coupled to, one or more processing devices, a memory, and/or a decoder, such as a hardware decoder. The electronic device 120 may be any device that is capable of decoding and/or decompression an encoded data stream, such as an encoded video stream. In one or more implementations, the decoder may implement one or more of the decoding, decompression, and/or storage techniques.

For example, when pixels and/or pixel components are written to memory, such as by a video processing engine, a group of pixels may be handled together in order to utilize the statistical redundancy within those pixels. In one or more implementations, the memory may be DRAM and may correspond to, for example, one or more graphical frame buffers. In one or more implementations, a targeted number of bits may be used to represent the group of pixels. The targeted number of bits may be, for example, more than, less than, or equal to the original number of bits corresponding to the group of pixels.

In one or more implementations, the electronic device 120 may be, or may include all or part of, a laptop or desktop computer, a smartphone, a tablet device, a wearable electronic device, such as a pair of glasses or a watch with one or more processors coupled thereto and/or embedded therein, a set-top box, a television or other display with one or more processors coupled thereto and/or embedded therein, or other appropriate electronic devices that can be used to decode an encoded data stream, such as an encoded video stream.

In FIG. 1, the electronic device 120 is depicted as a set-top box, e.g. a device that is coupled to, and is capable of displaying video content on, a display 124, such as a television, a monitor, or any device capable of displaying video content. In one or more implementations, the electronic device 120 may be integrated into the display 124 and/or the display 124 may be capable of outputting audio content in addition to video content. The electronic device 120 may receive streams from the CDN 110, such as encoded data streams, that include content items, such as television programs, movies, or generally any content items. The electronic device 120 may receive the encoded data streams from the CDN 110 via the antenna 116, via the network 108, and/or via the satellite 115, and decode the encoded data streams, e.g. using the hardware decoder.

FIG. 2 illustrates an example electronic device 120 implementing a graphics system for pixel storage in graphical frame buffers in accordance with one or more implementations. Not all of the depicted components can be used, however, and one or more implementations can include additional components not shown in the figure. Variations in the arrangement and type of the components can be made without departing from the spirit or scope of the claims as set forth herein. Additional components, different components, or fewer components can be provided.

The electronic device 120 includes a graphics rendering and preparation section 202 and a display section 204. The graphics rendering and preparation section 202 can include one or more decoders 222 (depicted as "video decoder"), a processing unit block 224, and a memory 226. The display section 204 can include a display engine block 240. In one or more implementations, the memory 226 can be, or can include, DRAM. In one or more implementations, the processing unit block 224 includes one or more central processing unit blocks 235 (depicted as "CPU"), a three-dimensional (3D) graphics engine block 237, and a two-dimensional (2D) graphics engine block 239. Each of the one or more CPU blocks 235, 3D graphics engine block 237, and 2D graphics engine block 239 can individually access the memory 226, and read and write pixel data to/from the memory 226. In one or more implementations, each of the CPU blocks 235, 3D graphics engine blocks 237, and/or 2D graphics engine blocks 239 may be any device that is capable of decoding and/or decompressing an encoded data stream, such as an encoded video stream, and capable of encoding and/or compressing a decoded data stream, such as a decoded video stream. In one or more implementations, the processing unit block 224 can include one or more MPEG feeder modules, one or more scaler modules, or generally any image processing blocks or modules.

In operation, the decoder 222 can receive one or more video streams, e.g. from one or more AV stream sources. For example, the decoder 222 may receive an incoming video stream signal 212. The incoming video stream signal 212 may flow as compressed digital data or digitized baseband analog video. The decoder 222 can decompress and decode the incoming video stream signal 212 and buffer still frame images of the video stream in the memory 226. The decoder 222 may generate decodable streams based on the incoming video stream signal 212. The decoder 222 may retrieve the decodable streams from the memory 226, decode them and re-store them in the memory 226. In some aspects, the memory 226 may be controlled by a memory control module (not shown). In one or more implementations, the incoming video stream signal 212 can include video streams that are already in a decoded format, e.g. a video stream received from a Blu-ray player, and the decoder 222 can be bypassed.

Multiple processing blocks (e.g., CPU block 235, 3D graphics engine block 237, 2D graphics engine block 239) read and write pixel data from/to the memory 226. Each of the processing blocks can render pixels and the output pixels of one block may be subsequently input to another in order to process further, such as blending multiple planes into a single composited graphics buffer (not shown). In some implementations, at least one of the processing blocks 224 may then operate on the decoded streams. The processing unit blocks 224 may perform image processing on the still frame images of the video streams, e.g. scaling, etc., and provide the processed frames to the display engine block 240. For example, the CPU block 235 can apply scaling and compose frames. In other examples, either of the 3D graphics engine block 237 and/or the 2D graphics engine block 239 can combine graphics or additional video with the incoming video stream signal 212. The resulting stream may be then sent to one or more video encoders (not shown) for display through suitable output interfaces, such as video output interface 214.

Each of the processing blocks 224 may obtain uncompressed pixel data output from other processing blocks, such as the CPU 235, 3D graphics engine block 237, or 2D graphics engine block 239 via the memory 226. The processing blocks 224 may process the incoming video stream signal 212 based on the input format and output format of the signal, and any appropriate system requirements. The incoming video stream signal 212 may be scaled and converted to the output display format directly, or go through single and multiple capture and playback loops via the 3D/2D engine blocks 235, 237. Each capture and playback loop may involve data processing, such as DNR, MAD-IT, or scaling, among others. The memory 226 may include a series of graphical frame buffers, such as displayable buffers, which allow an unlimited number of graphics layers to be composited and blended together before being displayed. The display engine 240 can read a number of prepared graphical frame buffers in parallel and perform final blending for display. An example process of decoding the compressed pixels and storing the uncompressed pixels in memory is discussed further below with respect to FIG. 5A.

Once the graphical frame buffers are available, they can be combined with the video using a compositor. The compositor may allow up to two video surfaces to be combined with data stored in a graphical frame-buffer. In some implementations, the blending order of any surface may be controlled by a computer-implemented process. The processing unit blocks 224 receive the still frame images and determine the pixels of the still frame images that will be visible, e.g. not occluded, in a composite image.

In one or more implementations, when the images are to be composited into a composite image, the processing unit blocks 224 and/or the display engine block 240 can receive position information items and layer indications for each of the still frame images, e.g. from the application layer. For example, the processing unit blocks 224 and/or the display engine block 240 can be communicatively coupled to a host processor (not shown) of the electronic device 120 and the host processor can provide the position information items and/or the layer indications to the processing unit blocks 224 and/or the display engine block 240.

During video processing, any graphics or additional video are combined immediately before being displayed, and the manipulated video is then sent to one or more video encoders (not shown) for display, through the video output interface 214. Each of the processing unit blocks 224 may include an encoder that encodes, e.g. compresses, the pixels of the images that will be visible in the composite image, which can be referred to as the visible pixels of the images, and stores the compressed visible pixels in the graphical frame buffers of the memory 226. The capture block 239 then determines a location, e.g. an address, in the memory 226 to write the compressed pixels of each of the images, e.g. based at least on the position information for each of the images, and writes the compressed pixels to the determined locations of the memory 226. An example process of compressing the visible pixels of the images and writing the compressed pixels to the memory 226 is discussed further below with respect to FIG. 5B.

The graphics system may generate rendered graphics in one or more of the 3D graphics engine block 237 or the 2D graphics engine block 239 in response to a request to display rendered graphics. Examples of requests to display rendered graphics may include activating a menu, changing a channel, browsing a channel guide, displaying a photo or video, and other requests that may result in the display of rendered graphics. In response to a request to render graphics, the graphics system may first determine the colorspace and nonlinear space that the will be used to render the graphics. The decision to render the graphics in a particular colorspace or nonlinear space may depend on multiple performance parameters that may correspond to the capacity of the various components of the graphics system and/or other parameters of components external to the graphics system.

Upon completion of rendering the graphics, the processing unit blocks 224 and/or the display engine block 240 may perform various colorspace conversions or nonlinear space conversions to the rendered graphics. The converted graphics may then be combined with the still frame images and video in the compositor to generate a blended video output. For example, the compositor may receive the still frame images of the video stream to add additional rendered graphics and enhancement information to each still frame image. The blended video output may be provided to a post processor (not shown). The post processor may perform colorspace conversions or nonlinear conversions to the blended video to generate a converted output.

The display engine block 240 can generate the composite image in an on-chip display buffer (not shown) and can provide the composite image to the output device 124, e.g. for display. The composite image including combined video frames and graphics may be output to a display by the video output interface 214 relevant to the particular application of the graphics scaling system or display device. The video output interface 214 may include an HDMI graphics connection, component video, A/V, composite, co-axial, or any other connection compatible with a particular video display.

The display engine block 240 may provide output signals in any suitable format. For example, the display engine block 240 may provide HD/SD, ITU-R-656 TTX, HDMI or any other suitable format. In some implementations, the display engine block 240 includes a video encoder that supports the following output standards: NTSC-M, NTSC-J, PAL-BDGHIN, PAL-M, PAL-Nc, and SECAM. In some implementations, the following output formats are additionally supported: composite, S-video, SCART1, SCART2, RGB and YPrPb component, and the display engine block 240 may support output resolutions of 480i, 480p, 576i, 576p, 720p, 1080i, 1080p, 2K, ultra-high definition (UHD), 4K, 8 k, among others. In some implementations, high quality video and graphics processing are integrated into an integrated circuit die, featuring 2D/3D graphics processing while still maintaining efficient use of memory bandwidth.

In one or more implementations, the decoder 222, the processing unit block 224, and/or the display engine block 240 can be implemented in software (e.g., subroutines and code). In one or more implementations, the decoder 222, the processing unit block 224, and/or the display engine block 240 can be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

FIG. 3 illustrates a dataflow for an example graphics system 300 for pixel storage in graphical frame buffers in accordance with one or more implementations. Not all of the depicted components can be used, however, and one or more implementations can include additional components not shown in the figure. Variations in the arrangement and type of the components can be made without departing from the spirit or scope of the claims as set forth herein. Additional components, different components, or fewer components can be provided.

The graphics system 300 includes a processing block 310 and the memory 226. The processing block 310 includes a decompression block 312, a padding discard block 314, a processing unit core 316, a lossy compression block 320, and a padding insertion block 318. In one or more implementations, each of the CPU blocks 235, 3D graphics engine block 237 and 2D graphics engine block 239 may be, or include at least a portion of, the processing block 310. The memory 226 includes graphical frame buffers 332-1 and 332-2 for storing lossy-compressed HDR pixel data, and includes graphical frame buffers 334-1 and 334-2 for storing uncompressed HDR pixel data. The decompression block 312 includes an input interface with the graphical frame buffer 332-1 for obtaining the lossy compressed HDR pixel data from storage. The lossy compression block 320 includes an output interface to the graphical frame buffer 332-2 for storing the lossy compressed HDR pixel data. The padding discard block 314 has an input interface with the graphical frame buffer 334-1 to receive the uncompressed HDR pixel data and remove (or discard) any padding from the pixel data frame. The padding insertion block 318 has an output interface with the graphical frame buffer 334-2 to store pixel data frames containing padding inserted with the uncompressed HDR pixel data. Each of the decompression block 312 and the padding discard block 314 has a respective output interface to the processing unit core 316 for processing on the uncompressed HDR pixel data. Each of the lossy compression block 320 and the padding insertion block 318 has a respective input interface with the processing unit core 316 to receive the processed uncompressed HDR pixel data for storing the respective HDR pixel data into the memory 226.

In operation, the processing block 310 retrieves bytes of compressed visible pixels, such as the lossy compressed HDR pixel data, from the graphical frame buffer 332-1 of the memory 226, determines the image that corresponds to the compressed visible pixels, e.g. based at least on the position information and the memory address from which the bytes were retrieved from the memory 226, and may store the compressed visible pixels in another graphical frame buffer in the memory 226 associated with the determined image, such as the graphical frame buffer 332-2. The processing block 310 can generate a composite image, e.g. line-by-line, by retrieving the appropriate compressed visible pixels from the appropriate graphical frame buffers 332-1, e.g. based at least on the position information and the layer indications, and decoding, e.g. decompressing, the compressed HDR pixel data using a local decoder, such as the decompression block 312.

In some implementations, many non-displayable buffers (e.g., buffers containing ancillary data) are not suitable for lossy compression as any loss of information may have severe detrimental consequences to the graphics rendering process. Other non-displayable buffers may contain pixels that are not suitable for lossy compression as any loss of information can jeopardize the mathematical exactness expected for compliance tests for certain graphical systems (e.g., OpenGL, Vulkan). But being non-displayable, they do not have the real-time requirements as displayable buffers and as such, may be suitable for lossless compression. However, displayable buffers are ultimately destined for display on a TV or computer monitor. Given the properties of the human visual system and imperfections in the end-to-end graphics system anyway, as long as the quality of compression is high enough, lossy compression may be suitable for use with displayable buffers.

In order to reduce the effective number of bits per pixel, compression of the pixels can be performed by making use of statistical redundancy between pixels. While lossless compression can often reduce the number of bits needed to represent a given number of pixels, depending on the actual pixels and their statistical distribution, lossless compression can sometimes lead to an increase in the number of bits required to represent the pixels. This increase in bits may be due to the randomness or additional information effectively in the pixels, thus causing the lossless compression algorithm to not perform the compression as expected. While it is possible to place an upper bound on this increase to be just above the uncompressed size upwards, no assumption that a number of bits lower than the original number of bits can be made. In order to meet the real-time access requirements, this worst-case increase needs to be accounted for. While lossless compression often reduces the number of bits required to represent pixels, for real-time access purposes, lossless compression can be a detriment rather than a benefit.

In one or more implementations, the subject technology provides for a lossy compression method of storing HDR pixel data in graphics systems for use with the displayable graphical frame buffers with the properties described below. For example, when pixels and/or pixel components are written to the memory 226 as pixel data, such as by the processing block 310, a group of pixels may be handled together in order to utilize the statistical redundancy within those pixels. In one or more implementations, the memory 226 may be DRAM and may correspond to, or include, for example, one or more graphical frame buffers (e.g., 332-1, 332-2, 334-1, 334-2). In one or more implementations, a targeted number of bits may be used to represent the group of pixels. The targeted number of bits may be, for example, more than, less than, or equal to the original number of bits corresponding to the group of pixels.

As illustrated in FIG. 3, the dataflow within the graphics system 300 involves the processing block 310 reading and writing compressed or uncompressed HDR pixels. The processing block 310 may support all combinations of input and/or output being compressed/uncompressed depending on system requirements. While uncompressed HDR pixel data may be stored in the memory 226 with padding, the processing block 310 can discard the padding for internal processing. Also, the lossy compression block 320 can compress the real data since any future decompression of this data can reinsert the padding (typically 0's) at output time.

In one or more implementations, the processing block 310 can store pixels in the displayable graphical frame buffers of the memory 226 using 10-bits, 12-bits or more, for each of the R, G, B and A components internally in the graphics system 300. However, when the pixel data is written to the memory 226, a group of pixels (e.g. 4 pixels by 4 pixels for a total of 16 pixels) are handled together in order to utilize the statistical redundancy within those pixels. But critically compared to the lossless compression case above, a targeted number of bits are used, which may be smaller than the original number of bits, to represent the group of pixels. In some implementations, the targeted number of bits is more than is needed to represent the group of pixels. In this case, however, the bits needed are padded to meet the targeted number of bits, and therefore, the random access properties required can be maintained. If more than the targeted number of bits is required to represent the group of pixels, the number of bits used is limited to the targeted number of bits. In some aspects, a subset of the information is discarded, and the processing block 310 attempts to discard information that is not visually significant. As compared to the lossless compression algorithm, which can produce mathematically-identical original and subsequently decompressed compressed-buffers, the lossy compression algorithm can provide visually (but not mathematically identical) lossless compression.

In some implementations, the targeted number of bits can be a power of two value (e.g., 32, 64, 128, etc.), and based on a compression ratio. If the targeted number of bits is too small, the compression ratio may be too high, and thus, detrimental to the visual quality. The subject technology provides for determining the proper targeted number of bits to achieve sufficient visual quality. In one or more implementations, the targeted number of bits is based on a multiple of the DRAM burst size. For example, the DRAM burst size may be referred to as a burst length used in transmitting data to the memory 226.

The compression ratio may be the actual number of bits per the targeted number of bits. The state of art for compression ratios is about 10:1, but the ratio value may vary depending on implementation. Because the subject system is configured to process a small block (e.g., 4×4 pixel block), and the image processing is performed relatively in real-time, the objective of the subject system may be more conservative at 2:1, compared to the state of the art at 10:1. Effectively, compression ratios of 10:1, for example, may not be feasible with such a relatively small number of pixels to process, because there is not enough redundancy in those pixels to utilize the compression effectively.

FIG. 4 illustrates an uncompressed graphical frame buffer 334 and a corresponding compressed graphical frame buffer 332 in accordance with one or more implementations. Not all of the depicted components can be used, however, and one or more implementations can include additional components not shown in the figure. Variations in the arrangement and type of the components can be made without departing from the spirit or scope of the claims as set forth herein. Additional components, different components, or fewer components can be provided.

The uncompressed graphical frame buffer 334 may correspond to a displayable buffer that contains HDR pixel data for display in some implementations, or may correspond to a non-displayable buffer that contains ancillary data (not for display) in other implementations. In some implementations, the compressed graphical frame buffer 332 corresponds to the displayable buffer that contains lossy-compressed HDR pixel data. The compressed graphical frame buffer 332 may contain HDR compressed data that once decompressed, corresponds to the same block of HDR pixel data of the corresponding uncompressed graphical frame buffer 334.

In one or more implementations, the graphical frame buffer 334 can store pixel data having a first pixel format considered for HDR graphics systems, which can be generally referred to as RGB10_A2. For example, in one 32-bit word, the first pixel format includes the red, green and blue components packed with 10-bits each and an Alpha component having two bits. Generally, two bits is not sufficient for the Alpha component to perform proper blending. However, reserving 10-bits for the Alpha component does not fit in the first pixel format. The first pixel format meets the packing, efficiency, random access and real-time access requirements, but with only two bits available for Alpha, the first pixel format does not meet the resolution needed in Alpha in order to adequately be used for a modern user interface.

In one or more implementations, the graphical frame buffer 334 can store pixel data having a second pixel format considered for HDR graphics systems, which can be generally referred to as RGBA10×6. For example, each of the R,G,B and A components has 10 bits, but each is padded to 16-bits to fit into a 16-bit half-word per component, so that the entire pixel fits into 64-bits for packing and random access purposes. This provides the advantage of providing 10-bits per component, but with 40-bits of information, the second pixel format takes up 64-bits of DRAM. In this respect, the efficiency of the second pixel format is low, because 24 bits out of 64 bits are left unused. Also, by requiring 64 bits per pixel, the amount of storage and bandwidth needed is doubled compared to SDR graphics systems and the first pixel format. In this respect, the second pixel format provides low efficiency, and by extension, high cost due to the extra read locations in DRAM that do not contain useful and valid information.

In one or more implementations, the graphical frame buffer 334 can store pixel data having a third pixel format considered for HDR graphics systems, which can be generally referred to as RGBA10. For example, each of the R,G,B and A components has 10 bits, however, each component is not padded to 16-bits compared to the second pixel format. Rather, each 10-bit component is packed successively to form 40-bits in a data unit, such as 64-bit word, and packing a portion of a next pixel in the same 64-bit word. For example, a first pixel occupies 40 bits out of 64 bits, and the remaining 24 bits is used for the R and G components of a second pixel and four bits of the B component of the second pixel. The remaining 6 bits of the B component and the Alpha component of the second pixel are stored in another data unit, such as another 64-bit word. This process is then repeated in the next 64-bit word. The third pixel format is more efficient than the second pixel format because the third pixel format uses less space thereby wasting less bits. However, the third pixel format can compromise the ability to perform random access, so the methodology of the subject technology may require reading several pixels at a time (e.g., several 64-bit data units) from memory to extract the targeted number of bits.

In one or more implementations, the graphical frame buffer 334 can store pixel data having a fourth pixel format considered for HDR graphics systems, which can be generally referred to as FP16. FP16 is a floating point pixel format, where each of the RGBA components is represented with a floating point number that is stored in 16-bits. In some aspects, the entire RGBA FP16 pixel requires 64 bits of storage. The fourth pixel format has sufficient resolution to represent HDR pixels. However, with its requirement for storage of 64 bits per pixel, the fourth pixel format has equivalent low efficiency as the second pixel format. In comparison to SDR systems and the first pixel format, the fourth pixel format also requires double the amount of storage and bandwidth, and by extension, is high cost.

The uncompressed graphical frame buffer 334 can store pixel data with uncompressed packing. For example, the uncompressed graphical frame buffer 334 can store pixel data having the second pixel format, namely RGBA10×6, where the pixel data bits are packed with 16-bits per component RGBA. In this format, 10 bits is represented as real data and 6 bits is represented as padding, per component. If the uncompressed graphical frame buffer 334 stores a block of pixel data, such as a 4×4 group of pixels, the packed block of pixel data can include a total of 1024 bits if represented with the second pixel format. In some implementations, alternatively, the uncompressed graphical frame buffer 334 can store pixel data having the third pixel format, namely RGBA10, where the pixel data bits are packed in succession with 10-bits per component RGBA. If the uncompressed graphical frame buffer 334 stores a block of pixel data, such as the 4×4 group of pixels, the packed block of pixel data can include a total of 640 bits.

Because the uncompressed graphical frame buffer 334 can store uncompressed pixel data that corresponds to more than one HDR pixel in a memory unit (e.g., 64-bit word), multiple memory units from DRAM (corresponding to a block of uncompressed HDR pixel data) are accessed and processed with the lossy compression algorithm to output a corresponding block of compressed HDR pixel data. In this respect, the compressed graphical frame buffer 332 stores compressed data that corresponds to a targeted number of bits. In one or more implementations, the targeted number of bits may be used to represent the group of pixels. The targeted number of bits may be, for example, more than, less than, or equal to the original number of bits corresponding to the group of pixels.

In one or more implementations, a group of pixels (e.g., 4×4 block of pixels) from a plurality of pixels can be stored in DRAM (or the memory 226) using a targeted number of bits. The targeted number of bits may be selected to provide a beneficial amount of compression, and designed to pack well in memory. The 4×4 group of pixels, in uncompressed form, can include 640 bits with the third pixel format. This group of pixels, using a lossy compression algorithm performed by the lossy compression block 320 (FIG. 3), can be compressed down to a targeted number of bits based on a compression ratio. Based on a compression ratio of about 2.5:1, and the original number of bits corresponding to the group of pixels is 640 bits, the targeted number of bits can be selected to be e.g., 256 bits. This is equivalent to 16 bits per pixel. In other examples, if the compression ratio is about 1.25:1, then the targeted number of bits can be selected to be 512 bits. In still other examples, if the compression ratio is about 5:1, the targeted number of bits can be selected to be 128 bits (when the original number of bits corresponding to the group of pixels is 640 bits). In other implementations, the targeted number of bits may correspond to a multiple of the DRAM burst size. The targeted number of bits may correspond to a power-of-two value (e.g., 16, 32, 64, 128, 256, 512, etc.) in some implementations, or may correspond to a multiple of two value in other implementations.

In one example, a group of pixels can be processed as a block. As illustrated in FIG. 4, a block 410 includes a N×M block of uncompressed HDR pixel data. The block 410 can include a 4×4 group of pixels that can be compressed into a corresponding N×M block of compressed HDR pixel data (e.g., 420). The block 410 can include, for example, 640 bits of uncompressed HDR pixel data, where each of the 16 pixels includes 10-bits per component (R,G,B,A). The block 410 of uncompressed HDR pixel data needs to fit into a known number of bits in DRAM (e.g., a targeted number of 256 bits). Given that the group of pixels includes 640 bits of information that needs to fit into 256-bit block in DRAM, a lossy compression algorithm is applied to this uncompressed block of information to remove any information that is visually less important. The objective of the lossy compression operation is to output compressed data that is equivalent to the targeted amount of bits (e.g., 256 bits). In some implementations, a block of compressed data may require some padding to ensure the compressed block of data corresponds to the targeted number of bits (e.g., includes 256 bits). If the uncompressed block of data includes additional information that is beyond what is required for compression, then the compressed block of data is still limited to the targeted number of bits to maintain conformance with the memory allocation in DRAM. In some implementations, regardless of the type of information (or type of pixels) contained in a group of pixels, the compressed output is a known bit value (or equivalent to the targeted number of bits).

Figure 5A:
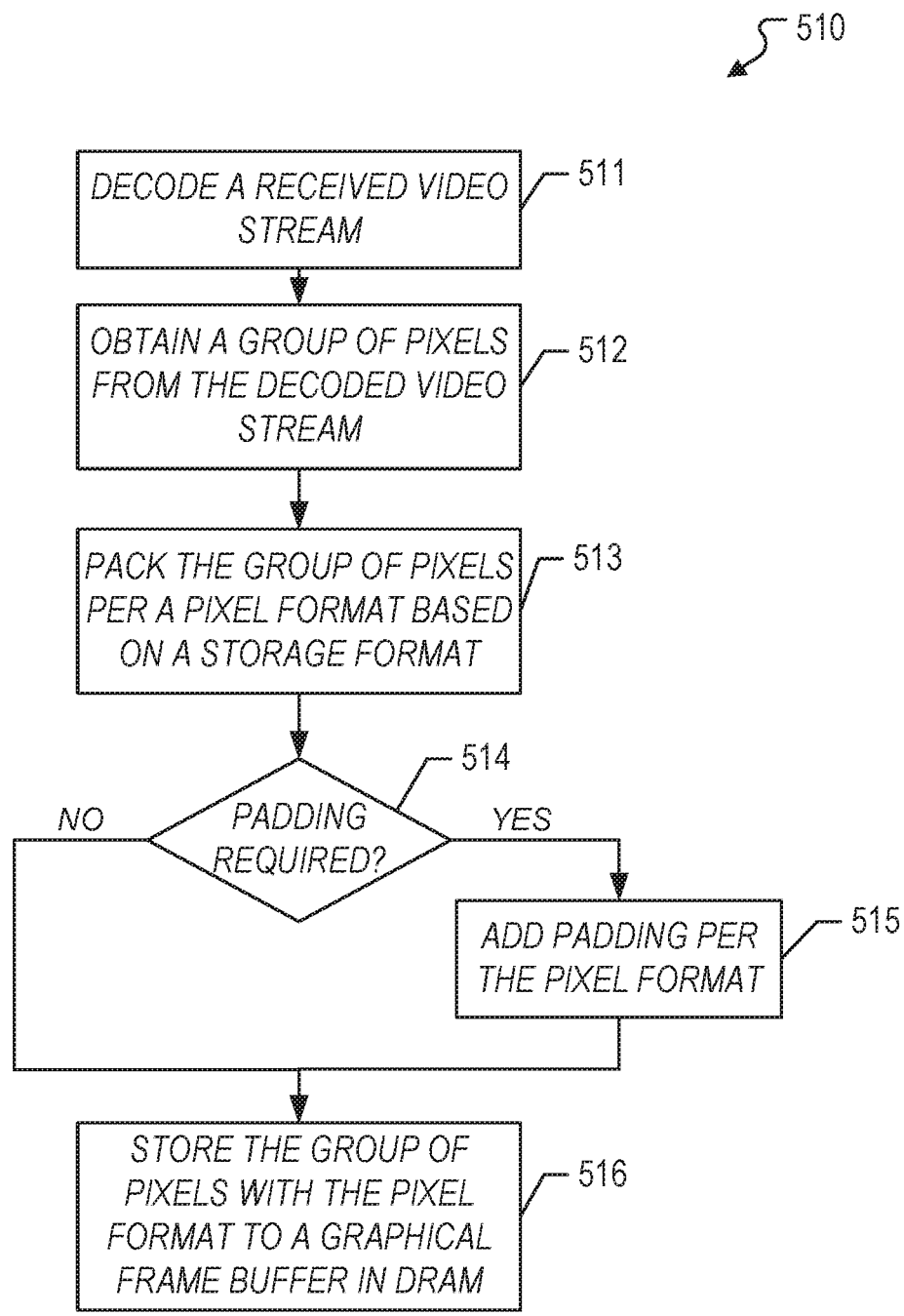
FIGS. 5A-5C illustrate flow diagrams of respective example pixel storage processes of a system for pixel storage in graphical frame buffers in accordance with one or more implementations.
Figure 5B:
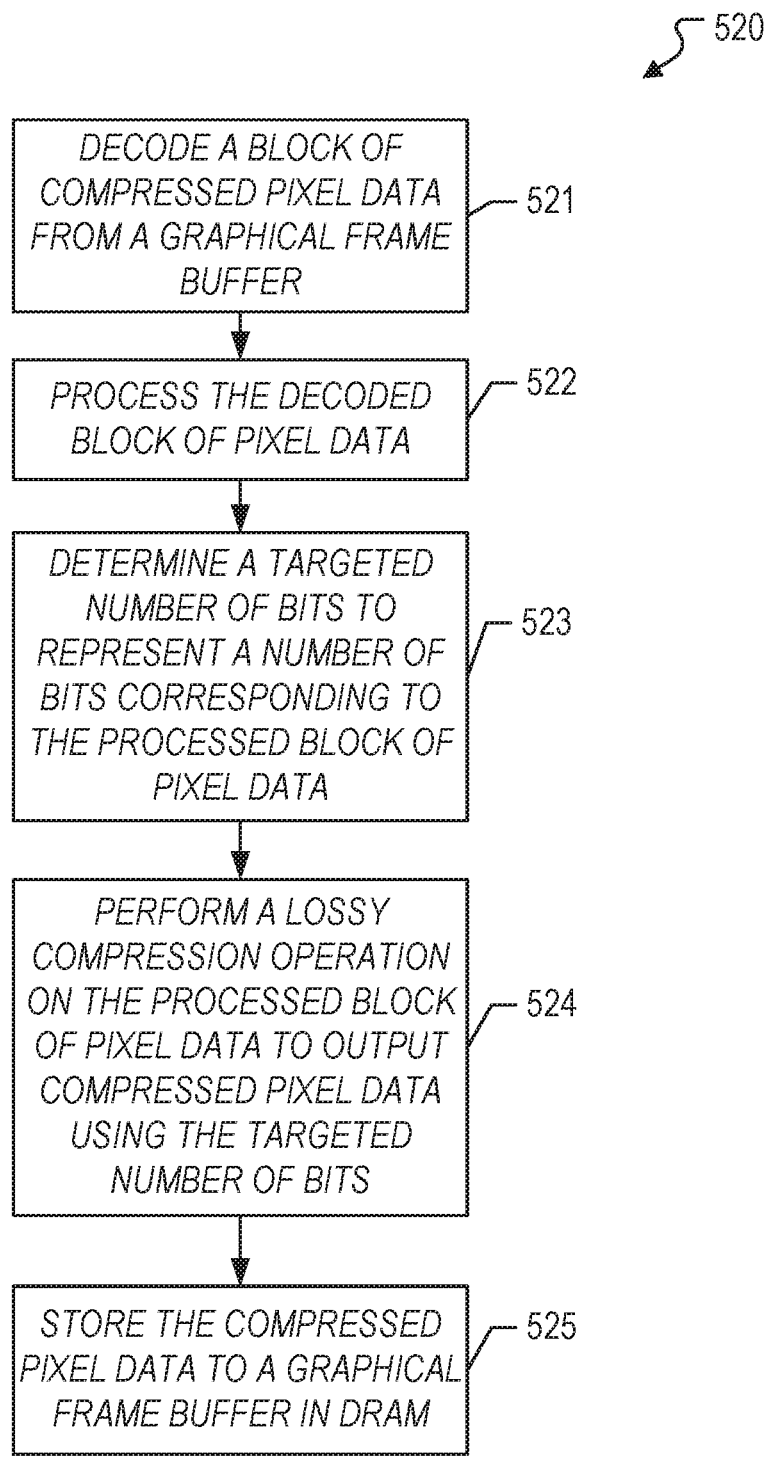
Figure 5C:
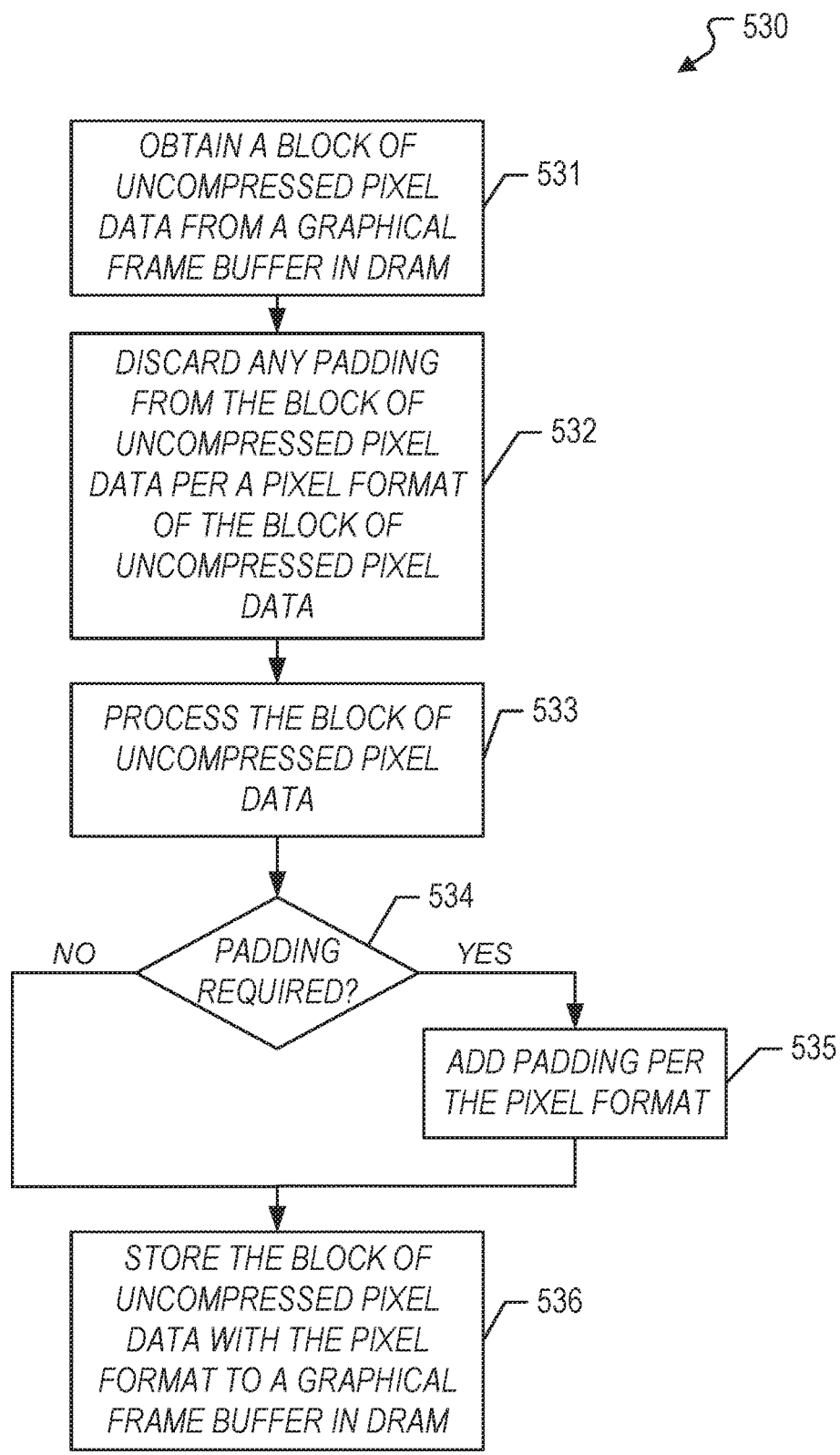

FIGS. 5A-5C illustrate flow diagrams of respective example pixel storage processes of a system for pixel storage in graphical frame buffers in accordance with one or more implementations, where FIG. 5A illustrates a flow diagram of an example pixel storage process 510, FIG. 5B illustrates a flow diagram of an example pixel storage process 500, and FIG. 5C illustrates a flow diagram of an example pixel storage process 530. For explanatory purposes, the example pixel storage processes 510, 520 and 530 are primarily described herein with reference to the processing block 310 of FIG. 3; however, the example pixel storage processes 510, 520 and 530 are not limited to the processing block 310 of FIG. 3, and the example pixel storage processes 510, 520 and 530 can be performed by one or more other components of the electronic device 120. Further for explanatory purposes, the blocks of the example pixel storage processes 510, 520 and 530 are described herein as occurring in serial, or linearly. However, multiple blocks of the example pixel storage processes 510, 520 and 530 can occur in parallel. In addition, the blocks of the example pixel storage processes 510, 520 and 530 can be performed a different order than the order shown and/or one or more of the blocks of the example pixel storage processes 510, 520 and 530 are not performed.

In FIG. 5A, the process 510 starts at step 511, where the processing block 310 decodes a received video stream (e.g., 212). Next, at step 512, the processing block 310 obtains a group of pixels from the decoded video stream. Subsequently, at step 513, the processing block 310 packs the group of pixels per a pixel format based on a storage format. The storage format may correspond to a memory access size (e.g., 32-bit word access). Next, at step 514, the processing block 310 determines whether pixel format of the group of pixels requires padding. If the pixel format does require padding, the process 510 proceeds to step 515. Otherwise, the process 510 proceeds to step 516. At step 515, the processing block 310 adds one or more padding bits to the group of pixels per the pixel format. Subsequently, at step 516, the processing block 310 stores the group of pixels with the pixel format to a graphical frame buffer (e.g., 334) in DRAM (e.g., 226).

In FIG. 5B, the process 520 starts at step 521, where the processing block 310 decodes a block of compressed pixel data from a first graphical frame buffer (e.g., 332-1) in DRAM (e.g., 226). Next, at step 522, the processing block 310 processes the block of decoded pixel data. Subsequently, at step 523, the processing block 310 determines a targeted number of bits to represent a number of bits corresponding to the processed block of pixel data. In some aspects, the targeted number of bits is different than the number of bits. Next, at step 524, the processing block 310 performs a lossy compression operation on the processed block of pixel data to output compressed pixel data using the targeted number of bits. Subsequently, at step 525, the processing block 310 stores the compressed pixel data to a second graphical frame buffer (e.g., 334-2) in DRAM.

In FIG. 5C, the process 530 starts at step 531, where the processing block 310 obtains a block of uncompressed pixel data from a first graphical frame buffer (e.g., 334-1) in DRAM (e.g., 226). Next, at step 532, the processing block 310 discards any padding from the block of uncompressed pixel data per a pixel format of the block of uncompressed pixel data. Subsequently, at step 533, the processing block 310 processes the block of uncompressed pixel data. Next, at step 534, the processing block 310 determines whether the pixel format of the block of uncompressed pixel data requires padding. If the pixel format does require padding, the process 530 proceeds to step 535. Otherwise, the process 530 proceeds to step 536. At step 535, the processing block 310 adds one or more padding bits to the block of uncompressed pixel data per the pixel format. Subsequently, at step 536, the processing block 310 stores the block of uncompressed pixel data with the pixel format to a second graphical frame buffer (e.g., 334-2) in DRAM (e.g., 226).

Figure 6:
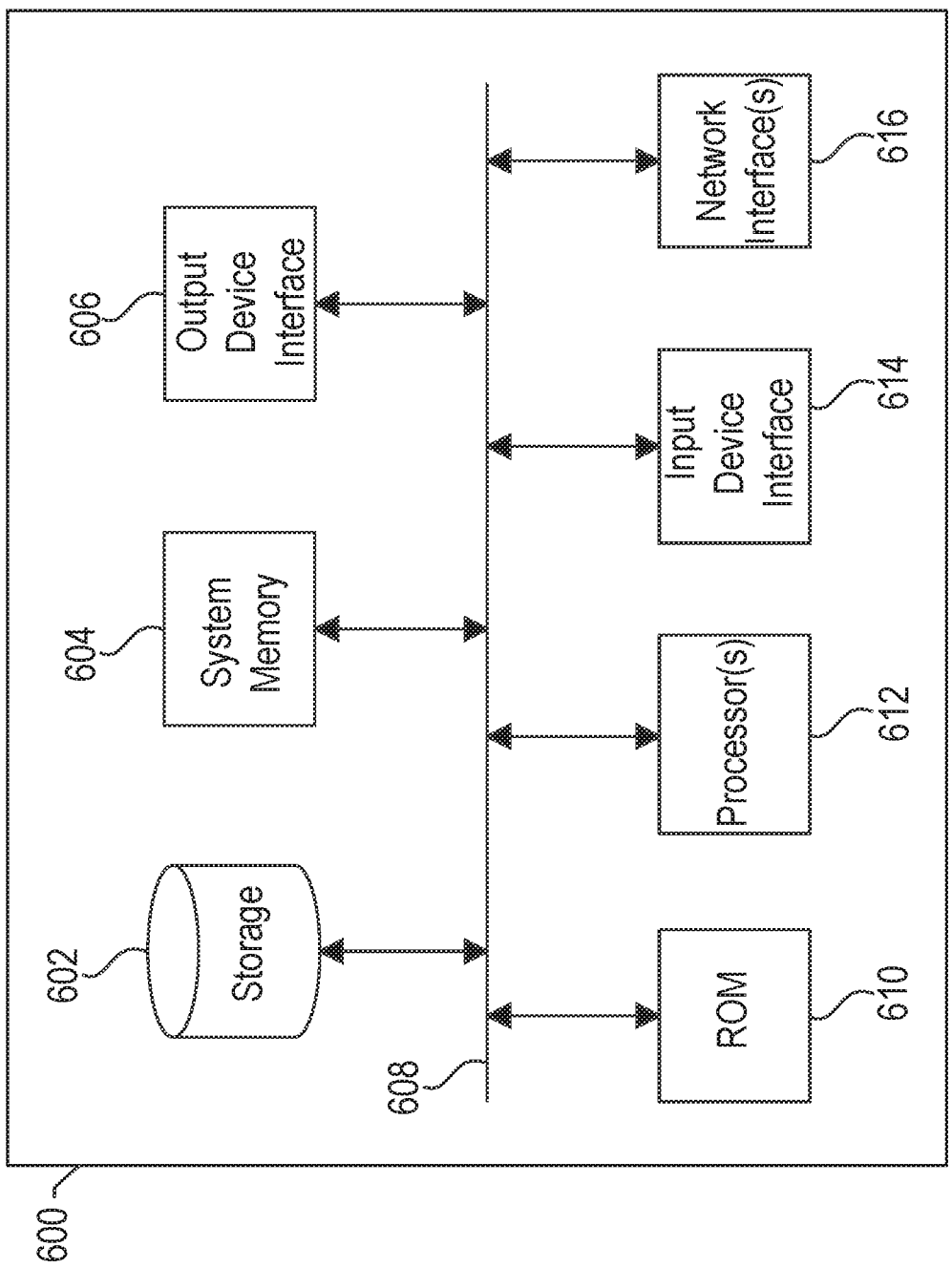
FIG. 6 conceptually illustrates an electronic system with which any implementations of the subject technology are implemented.

FIG. 6 conceptually illustrates an electronic system 600 with which one or more implementations of the subject technology may be implemented. The electronic system 600, for example, can be a network device, a media converter, a desktop computer, a laptop computer, a tablet computer, a server, a smartphone, or generally any electronic device that encodes and/or decodes video and/or audio streams. Such an electronic system 600 includes various types of computer readable media and interfaces for various other types of computer readable media. The electronic system 600 includes a bus 608, one or more processing unit(s) 612, a system memory 604, a read-only memory (ROM) 610, a permanent storage device 602, an input device interface 614, an output device interface 606, and a network interface 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system. The permanent storage device 602, on the other hand, is a read-and-write memory device. The permanent storage device 602 is a non-volatile memory unit that stores instructions and data even when the electronic system 600 is off. One or more implementations of the subject disclosure use a mass-storage device (such as a magnetic or optical disk and its corresponding disk drive) as the permanent storage device 602.

Other implementations use a removable storage device (such as a floppy disk, flash drive, and its corresponding disk drive) as the permanent storage device 602. Like the permanent storage device 602, the system memory 604 is a read-and-write memory device. However, unlike the permanent storage device 602, the system memory 604 is a volatile read-and-write memory, such as random access memory.

System memory 604 stores any of the instructions and data that the one or more processing unit(s) 612 needs at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input device interface 614 and the output device interface 606. The input device interface 614 enables a user to communicate information and select commands to the electronic system. Input devices used with the input device interface 614 include, for example, alphanumeric keyboards and pointing devices (also called "cursor control devices"). The output device interface 606 enables, for example, the display of images generated by the electronic system 600. Output devices used with the output device interface 606 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks (not shown) through one or more network interfaces 616. In this manner, the computer can be a part of one or more network of computers, such as a peer-to-peer network, a local area network ("LAN"), a wide area network ("WAN"), or an Intranet, or a network of networks, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "processor" and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
   at least one processor configured to:
   obtain a plurality of data units containing a plurality of pixels stored in memory, each of the plurality of data units including a first pixel of the plurality of pixels packed in succession with at least a portion of a second pixel of the plurality of pixels, the plurality of pixels being represented by a number of bits;
   obtain a group of pixels from the plurality of pixels; and
   store the group of pixels using a targeted number of bits, wherein the at least one processor is configured to:
   select a pixel format for the group of pixels based on a storage format;
   pack the group of pixels per the selected pixel format;
   determine that pixels of the group of pixels require padding to be added to conform to the pixel format;
   add padding to the pixels of the group of pixels per the pixel format; and
   store the pixels of the group of pixels.

2. The device of claim 1, wherein the targeted number of bits is different than the number of bits.

3. The device of claim 1, wherein the at least one processor is configured to:
   apply a lossy compression operation to the plurality of pixels; and
   generate the group of pixels as compressed data using the targeted number of bits based on the applied lossy compression operation.

4. The device of claim 3, wherein the at least one processor is configured to:
   determine a statistical redundancy between pixels of the group of pixels using the applied lossy compression operation; and
   remove one or more units of information from the group of pixels based on the statistical redundancy to reduce the group of pixels to a size that corresponds to the targeted number of bits.

5. The device of claim 1, wherein the at least one processor is configured to:
   obtain a block of compressed pixel data from a first frame buffer in the memory;
   decompress the block of compressed pixel data into a block of uncompressed pixel data;
   process the block of uncompressed pixel data;
   compress the processed block of uncompressed pixel data into a block of compressed pixel data using the targeted number of bits; and
   store the block of compressed pixel data to a second frame buffer in the memory.

6. The device of claim 5, wherein the block of compressed pixel data includes corresponding pixels of the block of uncompressed pixel data.

7. The device of claim 1, wherein the at least one processor is configured to:
   determine the targeted number of bits based on a predetermined compression ratio, the predetermined compression ratio being a ratio of the number of bits corresponding to the group of pixels to the targeted number of bits.

8. The device of claim 1, wherein the targeted number of bits corresponds to a multiple of a burst length used in transmitting data to memory.

9. The device of claim 1, wherein the at least one processor is configured to:
decode a received video stream into the plurality of pixels.

10. The device of claim 1, wherein the at least one processor is configured to:
obtain a block of uncompressed pixel data from a first frame buffer in the memory;
determine that a pixel format of the block of uncompressed pixel data includes one or more padding bits;
remove the one or more padding bits from the block of uncompressed pixel data;
process the block of uncompressed pixel data;
determine that the pixel format of the block of uncompressed pixel data requires at least one padding bit for storage;
add the at least one padding bit to the block of uncompressed pixel data; and
store the block of uncompressed pixel data with the added at least one padding bit to a second frame buffer in the memory.

11. The device of claim 1, wherein the at least one processor is configured to:
store the plurality of pixels as uncompressed pixel data based on a selected pixel format that corresponds to the number of bits;
store the group of pixels as compressed pixel data based on the targeted number of bits;
store the plurality of pixels and the group of pixels in different frame buffers.

12. A method, comprising:
obtaining a plurality of data units containing a plurality of pixels stored in memory, each of the plurality of data units including a first pixel of the plurality of pixels packed in succession with at least a portion of a second pixel of the plurality of pixels, the plurality of pixels being represented by a number of bits, the plurality of pixels comprising a group of pixels packed per a pixel format selected based on a storage format;
obtaining the group of pixels from the plurality of pixels;
determining that one or more pixels of the group of pixels require padding to be added to conform to the pixel format;
adding padding to the one or more pixels of the group of pixels per the pixel format;
compressing the group of pixels using a targeted number of bits; and
storing the compressed group of pixels.

13. The method of claim 12, wherein compressing the group of pixels comprises:
applying a lossy compression operation to the group of pixels; and
generating the compressed group of pixels with the targeted number of bits based on the applied lossy compression operation.

14. The method of claim 13, wherein applying the lossy compression operation comprises:
determining a statistical redundancy between pixels of the group of pixels using the applied lossy compression operation; and
removing one or more units of information from the group of pixels based on the statistical redundancy to reduce the group of pixels to a size that corresponds to the targeted number of bits.

15. The method of claim 12, further comprising:
determining the targeted number of bits based on a predetermined compression ratio, the predetermined compression ratio being a ratio of the number of bits corresponding to the group of pixels to the targeted number of bits.

16. A non-transitory, tangible computer-readable storage medium storing instructions, the instructions comprising:
instructions for obtaining a plurality of data units containing a plurality of pixels stored in memory, each of the plurality of data units including a first pixel of the plurality of pixels packed in succession with at least a portion of a second pixel of the plurality of pixels, the plurality of pixels being represented by a number of bits, the plurality of pixels comprising a group of pixels packed per a pixel format selected based on a storage format;
instructions for obtaining the group of pixels from the plurality of pixels;
instructions for determining that one or more pixels of the group of pixels require adding to be added to conform to the pixel format;
instructions for adding padding to the one or more pixels of the group of pixels per the pixel format;
instructions for compressing the group of pixels using a targeted number of bits different than the number of bits; and
instructions for storing the compressed group of pixels.

17. The non-transitory, tangible computer-readable storage medium of claim 16, wherein the instructions further comprise:
instructions for applying a lossy compression operation on the group of pixels; and
instructions for generating the compressed group of pixels with the targeted number of bits based on the applied lossy compression operation.

18. The non-transitory, tangible computer-readable storage medium of claim 17, wherein the instructions further comprise:
instructions for determining a statistical redundancy between pixels of the group of pixels using the applied lossy compression operation; and
instructions for removing one or more units of information from the group of pixels based on the statistical redundancy to reduce the group of pixels to a size that corresponds to the targeted number of bits.

19. The non-transitory, tangible computer-readable storage medium of claim 16, wherein the instructions further comprise:
instructions for determining the targeted number of bits based on a predetermined compression ratio, the predetermined compression ratio being a ratio of the number of bits corresponding to the group of pixels to the targeted number of bits.

20. The non-transitory, tangible computer-readable storage medium of claim 16, wherein the plurality of pixels represent high dynamic range (HDR) pixels.

* * * * *